United States Patent
Lee et al.

(10) Patent No.: US 12,068,444 B2
(45) Date of Patent: Aug. 20, 2024

(54) APPARATUS AND METHOD FOR MANUFACTURING ELECTRODE ASSEMBLY

(71) Applicant: LG ENERGY SOLUTION, LTD., Seoul (KR)

(72) Inventors: Su Ho Lee, Daejeon (KR); Jae Hong Kim, Daejeon (KR); Kwan Bo Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 592 days.

(21) Appl. No.: 17/295,229

(22) PCT Filed: Nov. 19, 2019

(86) PCT No.: PCT/KR2019/015847
§ 371 (c)(1),
(2) Date: May 19, 2021

(87) PCT Pub. No.: WO2020/106017
PCT Pub. Date: May 28, 2020

(65) Prior Publication Data
US 2022/0013803 A1    Jan. 13, 2022

(30) Foreign Application Priority Data
Nov. 20, 2018 (KR) .................... 10-2018-0143262

(51) Int. Cl.
*H01M 10/04* (2006.01)
*H01M 4/139* (2010.01)
(Continued)

(52) U.S. Cl.
CPC ....... *H01M 10/0404* (2013.01); *H01M 4/139* (2013.01); *H01M 10/0585* (2013.01); *H01M 50/403* (2021.01); *H01M 50/46* (2021.01)

(58) Field of Classification Search
CPC .......... H01M 10/0404; H01M 50/403; H01M 50/46; H01M 4/139; H01M 10/0585
(Continued)

(56) References Cited

U.S. PATENT DOCUMENTS 5,891,291 A * 4/1999 Okamoto .............. H05K 3/022
156/273.9
2008/0105381 A1   5/2008 Chikaki
(Continued)

FOREIGN PATENT DOCUMENTS

CN   206685487 U   * 11/2017   .......... H01M 10/058
CN   108292743 A     7/2018
(Continued)

OTHER PUBLICATIONS

International Search Report (PCT/ISA/210) issued in PCT/KR2019/015847, dated Mar. 2, 2020.
(Continued)

*Primary Examiner* — Pamela H Weiss
*Assistant Examiner* — John S Medley
(74) *Attorney, Agent, or Firm* — Birch, Stewart, Kolasch & Birch, LLP

(57) ABSTRACT

Discussed are an apparatus and a method for manufacturing an electrode assembly. The apparatus for manufacturing the electrode assembly includes a heater unit configured to heat a laminate of an electrode and a separator when the laminate passes therethrough, a lamination device configured to laminate the laminate that is heated while passing through the heater unit, and a moving unit configured to allow the laminate to be spaced a predetermined distance from the heater unit so that heat transferred from the heater unit to the laminate is reduced or blocked when an operation of the lamination device is stopped.

17 Claims, 6 Drawing Sheets

(51) Int. Cl.
  *H01M 10/0585* (2010.01)
  *H01M 50/403* (2021.01)
  *H01M 50/46* (2021.01)

(58) Field of Classification Search
  USPC .......................................................... 29/730
  See application file for complete search history.

(56) References Cited

U.S. PATENT DOCUMENTS

| | | | |
|---|---|---|---|
| 2008/0233476 A1 | 9/2008 | Jeong | |
| 2014/0013585 A1* | 1/2014 | Yuhara | B29C 66/81429 29/730 |
| 2014/0020240 A1* | 1/2014 | Watanabe | H01M 10/0404 29/730 |
| 2015/0129107 A1* | 5/2015 | Miyazaki | B32B 38/1841 156/522 |
| 2017/0069926 A1 | 3/2017 | Jeong et al. | |
| 2018/0043656 A1* | 2/2018 | Song | H01M 50/491 |
| 2019/0081345 A1 | 3/2019 | Lee et al. | |

FOREIGN PATENT DOCUMENTS

| | | | | |
|---|---|---|---|---|
| JP | 4-135742 A | 5/1992 | | |
| JP | 7-14631 B2 | 2/1995 | | |
| JP | 11-67230 A | 3/1999 | | |
| JP | 2005-93236 A | 4/2005 | | |
| JP | 2008-130453 A | 6/2008 | | |
| JP | 2013-134913 A | 7/2013 | | |
| JP | 2017-228349 A | 12/2017 | | |
| KR | 10-0823198 B1 | 4/2008 | | |
| KR | 20100110018 A | * | 10/2010 | ........... H01L 31/048 |
| KR | 10-2014-0015647 A | 2/2014 | | |
| KR | 10-2015-0034944 A | 4/2015 | | |
| KR | 10-2016-0047690 A | 5/2016 | | |
| KR | 10-1703617 B1 | 2/2017 | | |
| KR | 20170036398 A | * | 4/2017 | .......... H01M 10/058 |
| KR | 10-2018-0023185 A | 3/2018 | | |
| KR | 10-1888052 B1 | 8/2018 | | |
| WO | WO 2011/154998 A1 | 12/2011 | | |

OTHER PUBLICATIONS

Extended European Search Report for European Application No. 19888161.7, dated Nov. 15, 2021.

* cited by examiner

APPARATUS AND METHOD FOR MANUFACTURING ELECTRODE ASSEMBLY

CROSS-REFERENCE TO RELATED APPLICATION

The present application claims the benefit of the priority of Korean Patent Application No. 10-2018-0143262, filed on Nov. 20, 2018, which is hereby incorporated by reference in its entirety.

TECHNICAL FIELD

The present invention relates to an apparatus and method for manufacturing an electrode assembly.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

PRIOR ART DOCUMENTS

[PATENT DOCUMENTS] Korean Patent Publication No. 10-2014-0015647

DISCLOSURE OF THE INVENTION

Technical Problem

One aspect of the present invention is to provide an apparatus and method for manufacturing an electrode assembly, which is capable of preventing defects of the electrode assembly from occurring due to shrinkage of a separator by heat during stopping of a facility when heat is applied to an electrode and the separator to laminate the electrode and the separator, thereby manufacturing the electrode assembly.

Technical Solution

An apparatus for manufacturing an electrode assembly according to an embodiment of the present invention may comprise a heater unit configured to heat a laminate of an electrode and a separator when the laminate passes therethrough, a lamination device configured to laminate the laminate that is heated while passing through the heater unit, and a moving unit configured to allow the laminate to be spaced a predetermined distance from the heater unit so that heat transferred from the heater unit to the laminate is reduced or blocked when an operation of the lamination device is stopped.

A method for manufacturing an electrode assembly according to an embodiment of the present invention may comprise a heating process of applying heat a laminate of an electrode and a separator while the laminate passes through a heater unit, a lamination process of laminating the laminate while the laminate passes through a lamination device, and a heat transfer restriction process of allowing the laminate to be spaced a predetermined distance from the heater unit so as to reduce or block heat transfer from the heater unit to the laminate when an operation of the lamination device is stopped.

Advantageous Effects

According to the present invention, when the laminate of the electrode and the separator is heated through the heater so as to be laminated, if the lamination device is stopped, the laminate may move to the position that is spaced apart from the heater to prevent the laminate from being continuously exposed to the heat of the heater, thereby reducing or preventing the shrinkage of the separator.

In addition, according to the present invention, the air may be injected between the laminate and the heater unit to block the heat to be applied to the laminate and also cool the laminate, thereby preventing the separator from being shrunk.

In addition, according to the present invention, when the laminate of the electrode and the separator is heated through the heater unit so as to be laminated, the heater unit may move to be more spaced apart from the laminate, thereby more effectively prevent the defects of the electrode assembly from occurring by the shrinkage of the separator due to the continuous heating.

MODE FOR CARRYING OUT THE INVENTION

Figure 1:
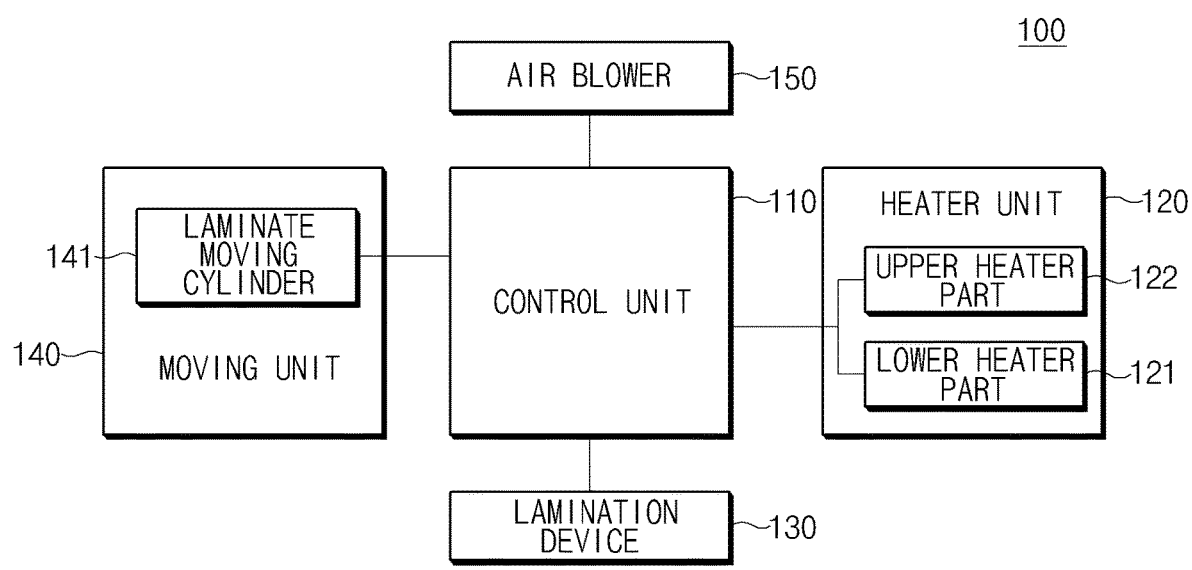
FIG. 1 is a conceptual block diagram of an apparatus for manufacturing an electrode assembly according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
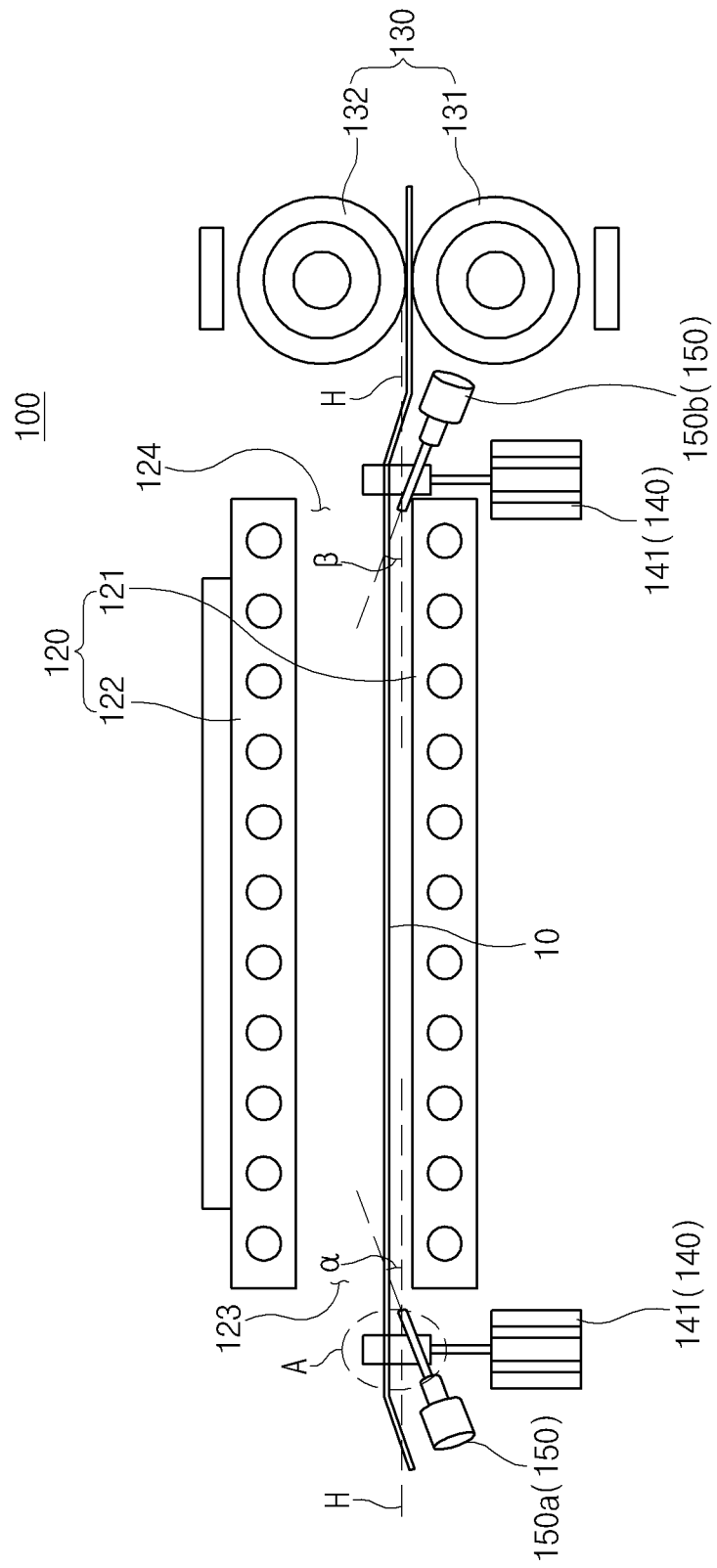
FIG. 2 is a front view exemplarily illustrating the apparatus for manufacturing the electrode assembly according to an embodiment of the present invention.

FIG. 1 is a conceptual block diagram of an apparatus for manufacturing an electrode assembly according to an embodiment of the present invention, and FIG. 2 is a front view exemplarily illustrating the apparatus for manufacturing the electrode assembly according to an embodiment of the present invention.

Referring to FIGS. 1 and 2, an apparatus 100 for manufacturing an electrode assembly according to an embodiment of the present invention comprises a heater unit 120 heating a laminate 10, a lamination device 130 laminating the laminate 10, and a moving unit 140 allowing the laminate 10 to be spaced a predetermined distance from the heater unit 120 when an operation of the lamination device 130 is stopped. Also, the apparatus 100 for manufacturing the electrode assembly according to an embodiment of the present invention may further comprise an air blower cooling the laminate 10 and a control unit 110 stopping heating operations of an upper heater part 122 and a lower heater part 121 when the operation of the lamination device 130 is stopped.

Figure 3:
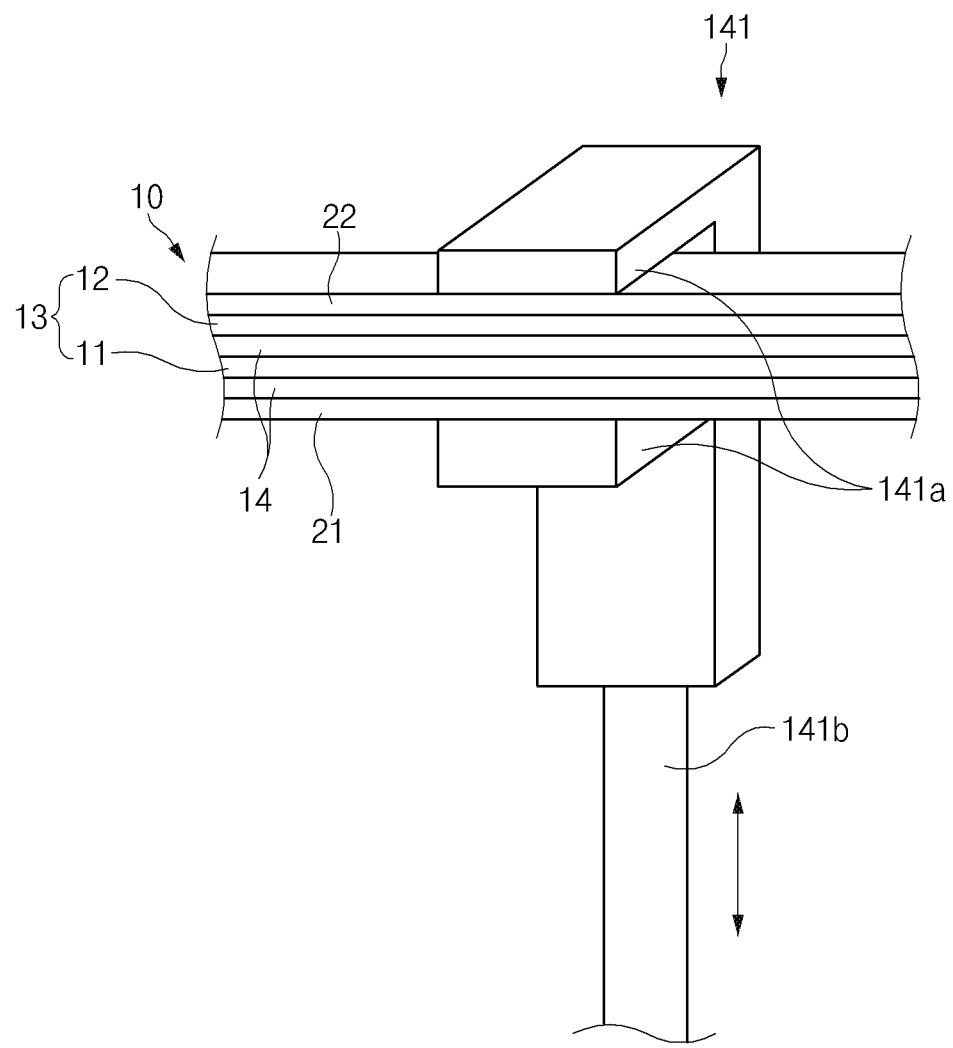
FIG. 3 is a perspective view exemplarily illustrating a main part of a laminate moving cylinder in the apparatus for manufacturing the electrode assembly according to an embodiment of the present invention.

FIG. 3 is a perspective view exemplarily illustrating a main part of a laminate moving cylinder in the apparatus for manufacturing the electrode assembly according to an embodiment of the present invention. Here, FIG. 3 is an enlarged view of an area A illustrated in FIG. 2.

Hereinafter, referring to FIGS. 1 to 4, the apparatus for manufacturing the electrode assembly according to an embodiment of the present invention will be described in more detail with reference to FIGS. 1 to 4.

Referring to FIGS. 2 and 3, the apparatus 100 for manufacturing the electrode assembly according to an embodiment of the present invention is an apparatus that laminates the laminate of the electrode 13 and the separator 14, which are alternately laminated, to manufacture the electrode assembly.

The electrode assembly 10 may be a chargeable and dischargeable power generation element and have a structure in which the electrode 13 and the separator 14 are alternately laminated. Here, the electrode 13 may comprise a positive electrode 12 and a negative electrode 11.

The laminate 10 is formed by alternately laminating the positive electrode 12, the separator 14, and the negative electrode 11. Also, for example, the laminate 10 may have a shape in which the separator 14, the negative electrode 11, the separator 14, and the positive electrode 12 are sequentially laminated. Also, the laminate 10 may have a shape in which protective films 21 and 22 are further attached to both the outermost surfaces of the structure in which the separator 14, the negative electrode 11, the separator 14, and the positive electrode 12 are sequentially laminated.

The positive electrode 12 may comprise a positive electrode collector (not shown) and a positive electrode active material (not shown) applied to the positive electrode collector. For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The negative electrode 11 may comprise a negative electrode collector (not shown) and a negative electrode active material (not shown) applied to the negative electrode collector. For example, the negative electrode collector may be provided as foil made of a copper (Cu) or nickel (Ni) material. The negative electrode active material may comprise synthetic graphite, a lithium metal, a lithium alloy, carbon, petroleum coke, activated carbon, graphite, a silicon compound, a tin compound, a titanium compound, or an alloy thereof. Here, the negative electrode active material may further comprise, for example, non-graphite-based SiO (silica) or SiC (silicon carbide).

Also, the separator 14 may be made of an insulating material and a flexible material. Here, the separator 14 may be made of, for example, a polyolefin-based resin film such as polyethylene or polypropylene having micropores.

The laminate 10 may further comprise the protective films 21 and 22 on top and bottom surfaces of a structure formed by laminating the electrode 13 and the separator 14 to pass through the heater unit 120 and the lamination device 130, thereby preventing the electrode 13 and the separator 14 from being damaged. Also, after the laminate 10 passes through the heater unit 120 and the lamination device 130, the protective films 21 and 22 disposed both the surfaces of the laminate 10 may be removed.

The heater unit 120 may heat the laminate 10 while the laminate 10 of the electrode 13 and the separator 14 passes therethrough.

Also, the heater unit 120 may comprise an upper heater part 122 and a lower heater part 121 and heat the laminate 10 while the laminate 10 passes between the upper heater part 122 and the lower heater part 121.

A heater may be embedded in each of the upper heater 122 and the lower heater 121 to generate heat, thereby transferring the heat to the laminate 10 so as to heat the laminate 10.

Furthermore, the upper heater part 122 and the lower heater part 121 be spaced a predetermined distance from each other to form a heating region in which the laminate 10 moves and is heated. In the heating region, an inlet 123 into which the laminate 10 is inserted and an outlet 124 from which the laminate 10 is withdrawn may be formed.

The heater unit 120 heats a lower portion of the laminate 10 while the laminate 10 moves along a top surface of the lower heater part 121 and heats an upper portion of the laminate 10 through the upper heater part 122 that is spaced a predetermined distance upward from the lower heater 121.

The lamination device 130 may laminate the laminate 10 that is heated while passing between the upper and lower heater parts 121 and 122.

The lamination device 130 comprises a first roller 131 and a second roller 132. The laminate 10 may be pressed while passing between the first roller 131 and the second roller 132, and the heated laminates 10 may be attached to each other.

The moving unit 140 may allow the laminate 10 to move to a position that is spaced a predetermined distance from the heater unit 120 so that the heat transferred from the heater unit 120 to the laminate 10 is reduced or blocked when an operation of the lamination device 130 is stopped.

The moving unit 140 may comprise a laminate moving cylinder 141 that allows the laminate 10 to move upward so as to be spaced apart from the lower heater part 121.

The lamination moving cylinder 141 may comprise, for example, a pneumatic cylinder or a hydraulic cylinder.

The lamination moving cylinder 141 may comprise a grip part 141a for gripping the laminate 10 and a moving shaft 141b that allows the grip part 141a to linearly move in a vertical direction.

For example, the laminate moving cylinder 141 may lift the laminate 10 upward to be spaced a distance of 5 mm to 30 mm from the lower heater part 121. Particularly, the laminate moving cylinder 141 may lift the laminate 10 upward to be spaced a distance of, for example, 10 mm to 15 mm from the lower heater part 121. Thus, the lamination moving cylinder 141 may allow the laminate 10 to be spaced 10 mm or more from the lower heater part 121 to reduce or prevent the heat of the lower heater part 121 to be transferred to the laminate 10 and also secure a space through which air discharged from the air blower 150 is injected or moves between the lower heater part 121 and the laminate 10, thereby preventing the heat of the lower heater part 121 from being transferred to the laminate 10 and easily cooling the laminate 10. When the laminate moving cylinder 141 allows the laminate 10 to be spaced 15 mm or less from the lower heater part 121, there is effects (advantages) to prevent the separator 14 from being shrunk and also prevent adhesion with the separator 14 from being deteriorated.

The laminate moving cylinder 141 may be provided in plurality and disposed on both sides of the heater unit 120 to grip both sides of the laminate 10, thereby lifting the laminate 10.

The air blower 150 may inject air between the laminate and the lower heater part 121 to cool the laminate 10.

Here, an air injection outlet of the air blower 150 may face, for example, a lower portion of the laminate 10 disposed at the inlet 123 of the heater unit 120. Here, the air blower 150 may be disposed at a side of the inlet 123.

Also, the air blower 150 may, for example, inject air at an angle α of 0° to 90° upward with respect to a virtual horizontal line H connecting the inlet 123 to the outlet 124 of the heater unit 120. Here, the air blower 150 may, for example, inject air at an angle α of 60° to 80° upward with respect to the virtual horizontal line H connecting the inlet 123 to the outlet 124 of the heater unit 120. Thus, the air may be injected upward in a range of 60° to 80° to prevent the separator 14 from being shrunk and also prevent the adhesion between the electrode 13 and the separator 14 from being deteriorated.

The air blower 150 may be further disposed at the outlet 124 of the heater unit 120 to face the lower portion of the laminate 10. Here, an air blower 150b disposed at the outlet 124 may be installed to correspond to an air blower 150a disposed at the inlet 123. Here, the air blower 150b disposed at the outlet 124 may, for example, inject air at an angle β of 0° to 90° upward with respect to the virtual horizontal line H connecting the inlet 123 to the outlet 124 of the heater unit 120. Particularly, the air blower 150b disposed at the outlet 124 may, for example, inject air at an angle β of 60° to 80° upward with respect to the virtual horizontal line H connecting the inlet 123 to the outlet 124 of the heater unit 120.

The control unit 110 may control heating operations of the upper heater part 122 and the lower heater part 121 and stop the heating operations of the upper heater part 122 and the lower heater part 121 when the operation of the lamination device 130 is stopped to prevent the heat from being applied to the laminate 10. Here, the control unit 110 may be electrically connected to the lamination device 130 to control the operation of the lamination device 130.

Also, the control unit 110 may restart the heating operations of the upper heater part 122 and the lower heater part 121 when restarting the operation of the lamination device 130 after the operation of the lamination device 130 is stopped.

Furthermore, the control unit 110 may be electrically connected to the laminate moving cylinder 141 and the air blower 150 to control the operations of the laminate moving cylinder 141 and the air blower 150.

In the apparatus for manufacturing the electrode assembly, which has the above-described configuration, according to an embodiment of the present invention, when the laminate 10 of the electrode 13 and the separator 14 is laminated by applying heat through the heater unit 120, if the lamination device is stopped, the laminate 10 may move to be spaced a predetermined distance from the heater unit 120, thereby preventing the laminate 10 from being continuously exposed to the heat of the heater unit 120 and thus reduce or prevent the shrinkage of the separator 14.

Also, air may be injected between the laminate 10 and the heater unit 120 to prevent the heat from being applied to the laminate 10 and also cool the laminate 10, thereby preventing the separator 14 from being shrunk.

Figure 4:
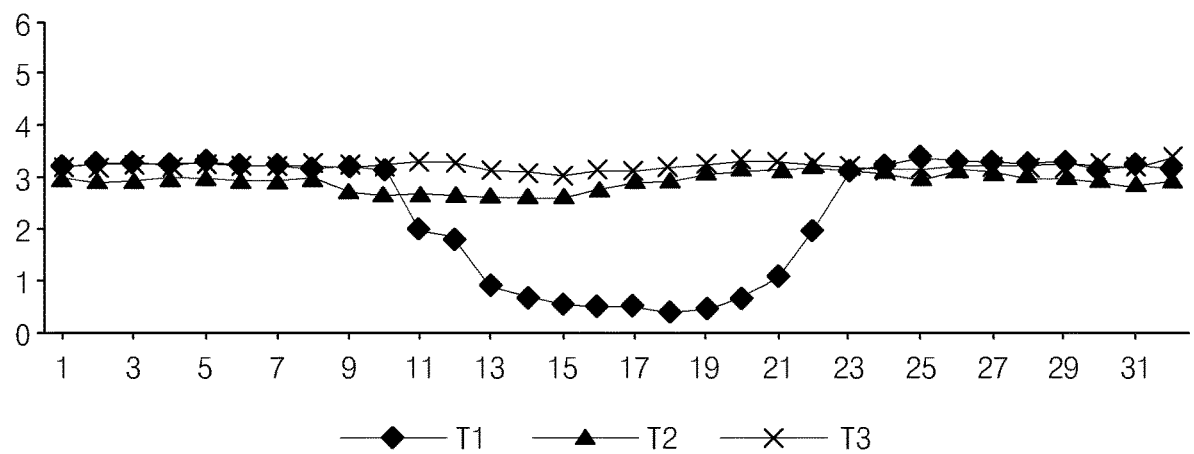
FIG. 4 is a graph illustrating a distance between a positive electrode and a separator in each of electrode assemblies manufactured through the apparatus for manufacturing the electrode assembly according to an embodiment of the present invention and an apparatus for manufacturing the electrode assembly according to the related art.

FIG. 4 is a graph illustrating a distance between a positive electrode and a separator in each of electrode assemblies manufactured through the apparatus for manufacturing the electrode assembly according to an embodiment of the present invention and an apparatus for manufacturing the electrode assembly according to the related art.

Here, FIG. 4 illustrates a graph obtained by measuring a distance between the positive electrode and the separator of the electrode assembly after the lamination device is restarted after the lamination device is stopped.

Here, in the graph illustrated in FIG. 4, an X axis that is a horizontal axis represents a section number of the electrode assembly manufactured by allowing the laminate of the electrode and the separator to pass through the heater unit and the lamination device, and a Y axis that is a vertical axis represents a distance (unit: mm) between the positive electrode and the separator in the electrode assembly.

Also, in the graph illustrated in FIG. 4, the electrode assembly manufactured according to the related art is represented by T1, and the electrode assembly manufactured according to an embodiment of the present invention is represented by T2 and T3. Here, T2 represents an electrode assembly in which the air blower is provided at one side of the heater unit, T3 represents an electrode assembly in which the air blower is provided at each of both sides of the heater unit.

As illustrated in the graph of FIG. 4, in the electrode assemblies T2 and T3 manufactured through the apparatus for manufacturing the electrode assembly according to an embodiment of the present invention, it is seen that, when the lamination device is stopped, the laminate is lifted through the moving unit, and then, air is injected between the lower heater part and the lamination through the air blower to block the heat transfer between the lower heater part and the laminate and cool the laminate, thereby preventing the separator from being shrunk. However, in the electrode assembly T1 according to the related art, it is seen that, when the lamination device is stopped, the laminate is continuously exposed to the heat of the heater unit, and thus, the separator is shrunk in sections 11 to 22 in the horizontal axis to decrease in distance between the positive electrode and the separator.

Thus, as illustrated in the graph of FIG. 4, in the electrode assembly manufactured through the apparatus for manufacturing the electrode assembly according to an embodiment of the present invention, it is seen that, when the laminate is prevented from being continuously exposed to the heat of the heater unit and also is cooled to prevent the separator from being shrunk, preventing defects of the electrode assembly from occurring.

Hereinafter, an apparatus for manufacturing an electrode assembly according to another embodiment of the present invention will be described.

Figure 5:
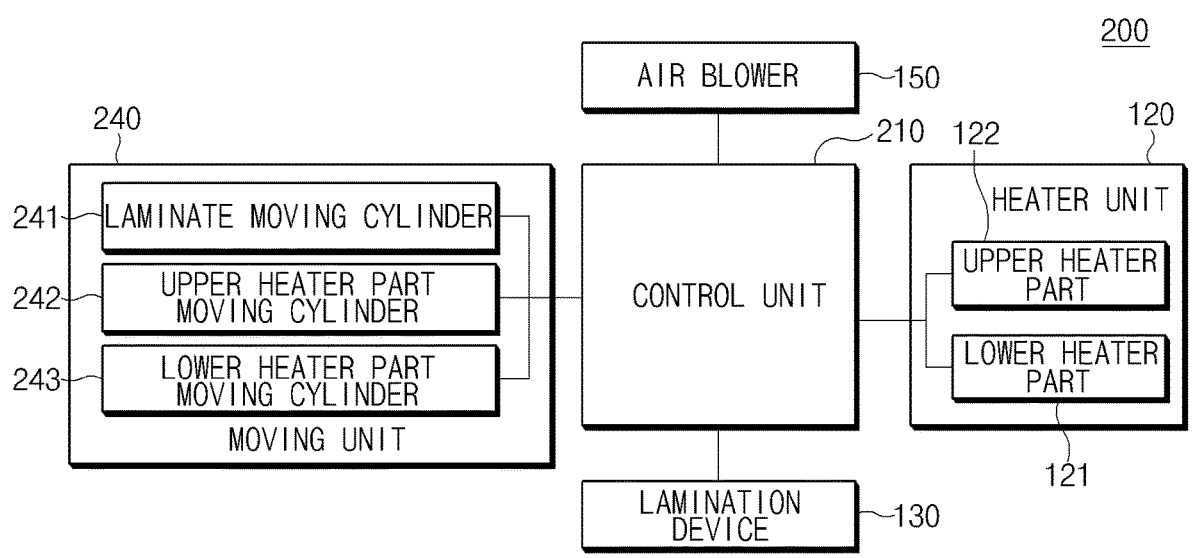
FIG. 5 is a conceptual block diagram of an apparatus for manufacturing an electrode assembly according to another embodiment of the present invention.
Figure 6:
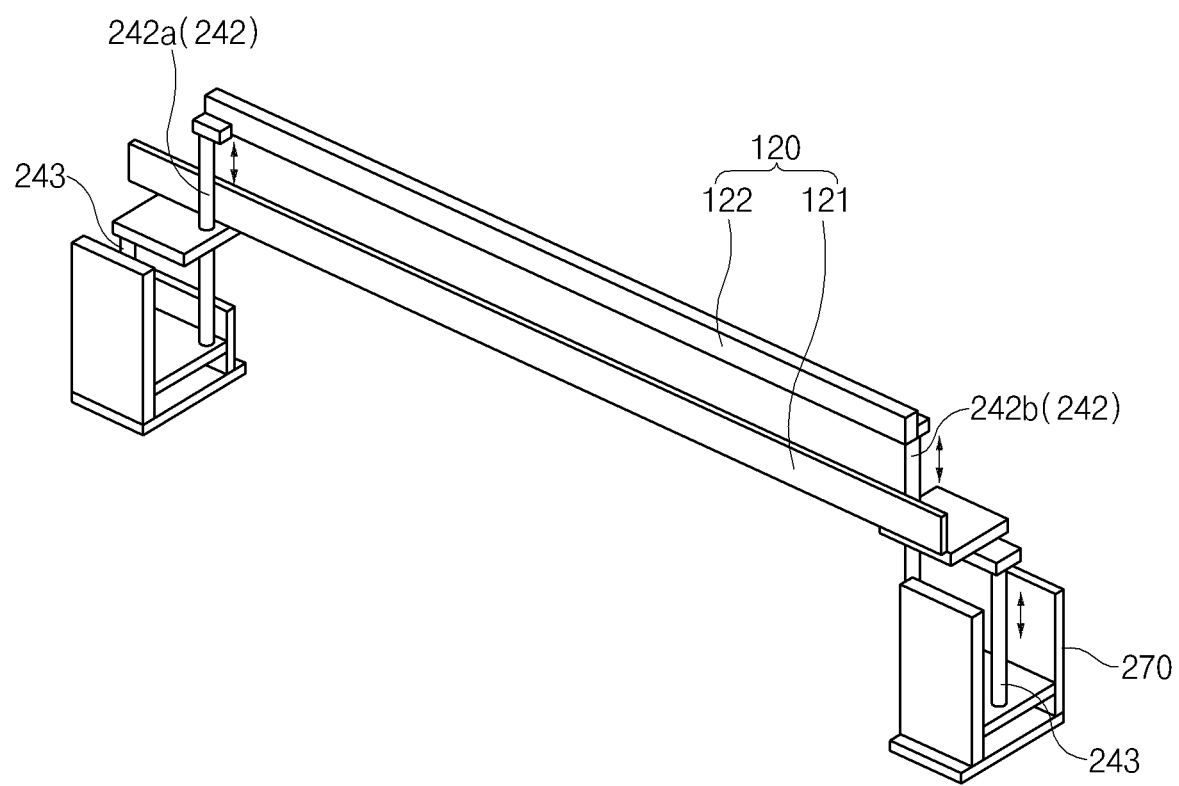
FIG. 6 is a perspective view exemplarily illustrating a heater unit and a moving unit in the apparatus for manufacturing the electrode assembly according to another embodiment of the present invention.

Referring to FIGS. 5 and 6, an apparatus 200 for manufacturing an electrode assembly according to another embodiment of the present invention may comprise a heater unit 120 heating a laminate 10, a lamination device 130 laminating the laminate 10, a moving unit 240 allowing the laminate 10 to be spaced a predetermined distance from the heater unit 120 when an operation of the lamination device 130 is stopped, an air blower 150 cooling the laminate 10, and a control unit 210 stopping heating operations of an upper heater part 122 and a lower heater part 121 when the operation of the lamination device 130 is stopped. (see FIG. 3)

The apparatus 200 for manufacturing the electrode assembly according to another embodiment of the present invention is different from the apparatus for manufacturing the electrode assembly according to the foregoing embodiment of the present invention in that the moving unit further comprises an upper heater part moving cylinder 242 and a lower heater part moving cylinder 243.

Thus, contents of this embodiment, which are duplicated with those according to the forgoing embodiment, will be briefly described, and also, differences therebetween will be mainly described.

In more detail, in the apparatus 200 for manufacturing the electrode assembly according to another embodiment of the present invention, the moving unit 240 may comprise the laminate moving cylinder 241, the lower heater part moving cylinder 243, and the upper heater part moving cylinder 242.

The laminate moving cylinder 241 may allow the laminate to move upward so as to be spaced apart from the lower heater part 121.

The lower heater part moving cylinder 243 may allow the lower heater part 121 to move downward to be spaced apart from the upper heater part 122 and the laminate. Furthermore, the lower heater part moving cylinder 243 may be provided in plurality and respectively disposed below both sides of the lower heater part 121.

The upper heater part moving cylinder 242 may allow the upper heater part 122 to move upward so as to be spaced apart from the laminate. Also, the plurality of upper heater part moving cylinders 242a and 242b may be disposed below both sides of the upper heater part 122.

Each of the laminate moving cylinder 241, the lower heater part moving cylinder 243, and the upper heater part moving cylinder 242 may be provided as, for example, a pneumatic cylinder or a hydraulic cylinder.

The lower heater part moving cylinder 243 and the upper heater part moving cylinder 242 may be supported by a support 270. Here, the support 270 may be, for example, a support frame.

The control unit 210 may control heating operations of the upper heater part 122 and the lower heater part 121 and stop the heating operations of the upper heater part 122 and the lower heater part 121 when the operation of the lamination device 130 is stopped.

Also, the control unit 210 may restart the heating operations of the upper heater part 122 and the lower heater part 121 when restarting the operation of the lamination device 130 after the operation of the lamination device 130 is stopped.

Furthermore, the control unit 210 may be electrically connected to the laminate moving cylinder 241, the lower heater part moving cylinder 243, the upper heater part moving cylinder 242, and the air blower 150 to control operations of the laminate moving cylinder 241, the lower heater part moving cylinder 243, the upper heater part moving cylinder 242, and the air blower 150.

In the apparatus 200 for manufacturing the electrode assembly, which has the above-described configuration, according to another embodiment of the present invention, when the laminate of the electrode 13 and the separator 14 is heated through the heater unit 120 so as to be laminated, if the lamination device 130 is stopped, the heater unit 120 may move to be more spaced apart from the laminate, thereby effectively preventing defects from occurring by shrinkage of the separator 14 due to continuous heating of the laminate.

Hereinafter, a method for manufacturing an electrode assembly according to an embodiment of the present invention will be described.

Referring to FIGS. 1 and 2, a method for manufacturing an electrode assembly according to an embodiment of the present invention comprises a heating process of applying heat a laminate 10 while the laminate 10 passes through a heater unit 120, a lamination process of laminating the laminate 10, and a heat transfer restriction process of allowing the laminate 10 to be spaced a predetermined distance from the heater unit 120 when an operation of a lamination device 130 is stopped.

The method for manufacturing the electrode assembly according to an embodiment of the present invention may be a method for manufacturing the electrode assembly through the apparatus for manufacturing the electrode assembly according to the forgoing embodiment. Thus, contents of this embodiment, which are duplicated with those according to the forgoing embodiment, will be briefly described, and also, differences therebetween will be mainly described.

In more detail, referring to FIGS. 2 and 3, in the method for manufacturing the electrode assembly according to an embodiment of the present invention, the heating process may be performed by applying heat to the laminate 10 while the laminate 10 of an electrode 13 and a separator passes through the heater unit 120.

Also, in the heating process, the heater unit 120 comprising an upper heater part 122 and a lower heater part 121 may heat the laminate 10 while the laminate 10 passes between the upper heater part 122 and the lower heater part 121. Here, the upper heater part 122 and the lower heater part 121 be spaced a predetermined distance from each other to form a heating region in which the laminate 10 moves and is heated. In the heating region, an inlet 123 into which the laminate 10 is entered and an outlet 124 from which the laminate 10 is withdrawn may be formed.

Furthermore, in the heating process, the heater unit 120 may heat a lower portion of the laminate 10 while the laminate 10 moves along a top surface of the lower heater part 121 and may heat an upper portion of the laminate 10 through the upper heater part 122 that is spaced a predetermined distance upward from the lower heater 121.

The lamination process may be performed by laminating the laminate 10 while the laminate 10 passes through the lamination device 130.

The lamination device 130 comprises a first roller 131 and a second roller 132. The laminate 10 may be pressed while passing between the first roller 131 and the second roller 132, and the heated laminates 10 may be attached to each other.

In the heat transfer restriction process, when the operation of the lamination device 130 is stopped, the laminate 10 may be spaced a predetermined distance from the heater unit 120 through a moving unit 140 so that heat transferred from the heater unit 120 to the laminate 10 is reduced or blocked.

Also, the heat transfer restriction process may comprise a laminate moving process, a cooling process, and a heating control process.

In the laminate moving process, when the operation of the lamination device 130 is stopped, the laminate 10 may move upward through the laminate moving cylinder 141 to allow the laminate 10 to be spaced apart from the lower heater part 121.

Also, in the laminate moving process, for example, the laminate 10 may be lift upward to be spaced a distance of 5 mm to 30 mm from the lower heater part 121. Particularly, in the laminate moving process, for example, the laminate 10 may be lift upward to be spaced a distance of 10 mm to 15 mm from the lower heater part 121.

Furthermore, in the laminate moving process, the laminate moving cylinder 141 may be provided in plurality and disposed on both sides of the heater unit 120. Thus, both sides of the laminate 10 may be griped and lifted through the plurality of laminate moving cylinders disposed on both sides of the heater unit 120.

In the cooling process, the air blower may inject air between the laminate 10, which moves to be spaced apart from the lower heater part 121 in the laminate moving process, and the lower heater part 121 to cool the laminate 10. Here, an air injection outlet of the air blower 150 may face the lower portion of the laminate 10 disposed at the inlet 123 of the heater unit 120. Here, the air blower 150 may, for example, inject air at an angle of 0° to 90° upward with respect to a virtual horizontal line connecting the inlet 123 to the outlet 124 of the heater unit 120. Also, the air blower 150 may, for example, inject air at an angle of 60° to 80° upward with respect to the virtual horizontal line connecting the inlet 123 to the outlet 124 of the heater unit 120.

In the heating control process, the control unit 110 may control heating operations of the upper heater part 122 and the lower heater part 121 and stop the heating operations of the upper heater part 122 and the lower heater part 121 when the operation of the lamination device 130 is stopped. Here, in the heating control process, the control unit 110 may be electrically connected to the lamination device 130 to control the operation of the lamination device 130.

Also, in the heating control process, the control unit 110 may restart the heating operations of the upper heater part 122 and the lower heater part 121 when restarting the operation of the lamination device 130 after the operation of the lamination device 130 is stopped.

Furthermore, in the heating control process, the control unit 110 may be electrically connected to the laminate moving cylinder 141 and the air blower 150 to control the operations of the laminate moving cylinder 141 and the air blower 150.

In the above-described method for manufacturing the electrode assembly according to an embodiment of the present invention, when the laminate 10 of the electrode 13 and the separator 14 is laminated by applying heat through the heater unit 120, if the lamination device is stopped, in the heat transfer restriction process, the laminate 10 may move to be spaced a predetermined distance from the heater unit 120, thereby preventing the laminate 10 from being continuously exposed to the heat of the heater unit 120 and thus reduce or prevent the shrinkage of the separator 14.

Also, in the cooling process, the air may be injected between the laminate 10 and the heater unit 120 to prevent the heat from being applied to the laminate 10 and also cool the laminate 10, thereby preventing the separator 14 from being shrunk.

Hereinafter, a method for manufacturing an electrode assembly according to another embodiment of the present invention will be described.

Referring to FIGS. 5 and 6, a method for manufacturing an electrode assembly according to another embodiment of the present invention comprises a heating process of applying heat the laminate 10 while the laminate 10 passes through the heater unit 120, a lamination process of laminating the laminate 10, and a heat transfer restriction process of allowing the laminate 10 to be spaced a predetermined distance from the heater unit 120 when an operation of a lamination device 130 is stopped. (see FIG. 3)

The method for manufacturing the electrode assembly according to another embodiment of the present invention is different from the method for manufacturing the electrode assembly according to the foregoing embodiment of the present invention in that the heat transfer restriction process further comprises an upper heater part moving process and a lower heater part moving process. Thus, contents of this embodiment, which are duplicated with those according to the forgoing embodiment, will be briefly described, and also, differences therebetween will be mainly described.

In more detail, in the method for manufacturing the electrode assembly according to another embodiment of the present invention, the heat transfer restriction process may comprise the laminate moving process, the cooling process, the heating control process, the lower heater part moving process, and the upper heater part moving process.

In the laminate moving process, when the operation of the lamination device 130 is stopped, the laminate may move upward to be spaced apart from the lower heater part 121.

In the cooling process, the air may be injected between the laminate, which moves to be spaced apart from the lower heater part 121 in the laminate moving process, and the lower heater part 121 to cool the laminate.

In the heating control process, the control unit 210 may control heating operations of the upper heater part 122 and the lower heater part 121 and stop the heating operations of the upper heater part 122 and the lower heater part 121 when the operation of the lamination device 130 is stopped. Here, in the heating control process, the control unit 210 may be electrically connected to the lamination device 130 to control the operation of the lamination device 130.

Also, in the heating control process, the control unit 210 may restart the heating operations of the upper heater part 122 and the lower heater part 121 when restarting the operation of the lamination device 130 after the operation of the lamination device 130 is stopped.

Furthermore, in the heating control process, the control unit 210 may be electrically connected to the laminate moving cylinder 241, the lower heater part moving cylinder 243, the upper heater part moving cylinder 242, and the air blower 150 to control operations of the laminate moving cylinder 241, the lower heater part moving cylinder 243, the upper heater part moving cylinder 242, and the air blower 150.

In the lower heater part moving process, the lower heater part 121 may move downward to be spaced apart from the laminate. Here, the lower heater part moving cylinder 243 may be provided in plurality and respectively disposed below both sides of the lower heater part 121.

In the upper heater part moving process, when the operation of the lamination device 130 is stopped, the upper heater part 122 may move upward to be spaced apart from the laminate. Here, the upper heater part moving cylinder 242 may be provided in plurality and respectively disposed below both sides of the upper heater part 122.

Each of the laminate moving cylinder 241, the lower heater part moving cylinder 243, and the upper heater part moving cylinder 242 may be provided as, for example, a pneumatic cylinder or a hydraulic cylinder.

In the above-described method for manufacturing the electrode assembly according to another embodiment of the present invention, when the laminate of the electrode 13 and the separator 14 is heated through the heater unit 120 so as to be laminated, if the lamination device 130 is stopped, in the heat transfer restriction process, the heater unit 120 may move to be more spaced apart from the laminate, thereby effectively preventing defects from occurring by shrinkage of the separator 14 due to continuous heating of the laminate.

While the present invention has been particularly shown and described with reference to exemplary embodiments thereof, it is to be understood that the scope of the present invention is not limited to the apparatus and method for the electrode assembly according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. An apparatus for manufacturing an electrode assembly, the apparatus comprising:
a heater unit configured to heat a laminate of an electrode and a separator when the laminate passes therethrough;
a lamination device configured to laminate the laminate that is heated while passing through the heater unit; and
a moving unit configured to allow the laminate to be spaced a predetermined distance from the heater unit so that heat transferred from the heater unit to the laminate is reduced or blocked when an operation of the lamination device is stopped,
wherein the heater unit comprises a lower heater part, and
wherein the moving unit comprises a laminate moving cylinder having a grip part to support the laminate, the laminate moving cylinder being configured to move the laminate upward so as to be spaced apart from the lower heater part.

2. The apparatus of claim 1, wherein the heater unit further comprises an upper heater part to heat the laminate while the laminate passes between the upper heater part and the lower part.

3. The apparatus of claim 2, wherein the moving unit further comprises a lower heater part moving cylinder configured to allow the lower heater part to move downward so as to be spaced apart from the upper heater part and the laminate.

4. The apparatus of claim 3, wherein the moving unit further comprises an upper heater part moving cylinder configured to allow the upper heater part to move upward so as to be spaced apart from the laminate.

5. The apparatus of claim 2, further comprising an air blower configured to inject air between the laminate and the lower heater part so as to cool the laminate.

6. The apparatus of claim 5, wherein an air injection outlet of the air blower faces a lower portion of the laminate disposed at an inlet of the heater unit.

7. The apparatus of claim 2, further comprising a control unit configured to stop heating operations of the upper heater part and the lower heater part when the operation of the lamination device is stopped.

8. A method for manufacturing an electrode assembly, the method comprising:
a heating process of applying heat to a laminate of an electrode and a separator while the laminate passes through a heater unit;
a lamination process of laminating the laminate while the laminate passes through a lamination device; and
a heat transfer restriction process of allowing the laminate to be spaced a predetermined distance from the heater unit so as to reduce or block heat transfer from the heater unit to the laminate when an operation of the lamination device is stopped,
wherein the heater unit comprises a lower heater part, and
wherein the heat transfer restriction process comprises a laminate moving process of moving the laminate upward so as to be spaced apart from the lower heater part using a moving unit comprising a laminate moving cylinder having a grip part to support the laminate.

9. The method of claim 8, wherein, in the heating process, the heater unit further comprising an upper heater part heats the laminate while the laminate passes between the upper heater part and the lower heater part, and
wherein the laminate is moved upward so as to be spaced apart from the lower heater part when the operation of the lamination device is stopped.

10. The method of claim 9, wherein the heat transfer restriction process further comprises a lower heater part moving process of allowing the lower heater part to move downward so as to be spaced apart from the laminate.

11. The method of claim 10, wherein the heat transfer restriction process further comprises an upper heater moving process of allowing the upper heater part to move upward so as to be spaced apart from the laminate when the operation of the lamination device is stopped.

12. The method of claim 9, wherein the heat transfer restriction process further comprises a cooling process of injecting air between the laminate, which moves to be spaced apart from the lower heater part in the laminate moving process, and the lower heater part to cool the laminate.

13. The method of claim 12, wherein in the laminate moving process, the laminate is lifted upward to be spaced a distance of 10 mm to 15 mm from the lower heater part.

14. The method of claim 9, wherein the heat transfer restriction process further comprises a heating control process of stopping heating operations of the upper heater part and the lower heater part when the operation of the lamination device is stopped.

15. The method of claim 9, wherein, in the heating process, a lower portion of the laminate is heated while the laminate moves along a top surface of the lower heater part, and wherein an upper portion of the laminate is heated through the upper heater part that is spaced a predetermined distance upward from the lower heater part.

16. The apparatus of claim 1, wherein each of an inlet and an outlet of a heating region of the heater unit includes the grip part.

17. The apparatus of claim 1, wherein the grip part supports the laminate by gripping the laminate between two portions of the grip part.

* * * * *